US007588613B2

(12) United States Patent
Gubler et al.

(10) Patent No.: US 7,588,613 B2
(45) Date of Patent: Sep. 15, 2009

(54) MOVABLE FILTER SYSTEM

(75) Inventors: Scott A. Gubler, St. George, UT (US); Daniel Esplin, Washington, UT (US)

(73) Assignee: Deseret Laboratories, Inc., St. George, UT (US)

(*) Notice: Subject to any disclaimer, the term of this patent is extended or adjusted under 35 U.S.C. 154(b) by 339 days.

(21) Appl. No.: 11/206,353

(22) Filed: Aug. 18, 2005

(65) Prior Publication Data
US 2006/0037295 A1   Feb. 23, 2006

Related U.S. Application Data

(60) Provisional application No. 60/603,387, filed on Aug. 20, 2004.

(51) Int. Cl.
*B01D 46/02* (2006.01)
(52) U.S. Cl. ............... 55/385.1; 55/284; 55/291; 55/293; 55/302; 55/341.1; 55/374; 55/378; 55/422; 55/478; 55/481; 55/484; 55/502; 55/517; 55/DIG. 46; 95/273; 95/278; 209/198; 209/223.1; 209/225; 241/222; 241/213; 241/242
(58) Field of Classification Search ............... 55/284, 55/291, 293, 302, 341.1, 374, 378, 385.1, 55/422, 478, 481, 484, 502, 517, DIG. 46; 95/273, 278; 209/198, 223.1, 225; 241/222, 241/213, 242
See application file for complete search history.

(56) References Cited

U.S. PATENT DOCUMENTS

| 1,797,812 A | * | 3/1931 | Waring | 209/23 |
| 3,349,919 A |   | 10/1967 | Royer et al. | |
| 3,747,307 A | * | 7/1973 | Peshina et al. | 55/379 |
| 3,813,853 A | * | 6/1974 | Anderson | 95/279 |
| 4,280,826 A | * | 7/1981 | Johnson, Jr. | 55/302 |
| 4,309,200 A | * | 1/1982 | Heffernan | 55/341.2 |
| 6,733,574 B2 | * | 5/2004 | Gubler | 95/273 |
| 7,232,476 B2 | * | 6/2007 | Ramanujam et al. | 96/177 |

OTHER PUBLICATIONS

International Preliminary Examination Report for PCT/US2005/29332, mailed Dec. 1, 2006.

* cited by examiner

*Primary Examiner*—Duane Smith
*Assistant Examiner*—Minh-Chau T Pham
(74) *Attorney, Agent, or Firm*—Holme Roberts & Owen LLP

(57) ABSTRACT

A movable filter system is provided for moving one or more filters of a filter assembly between an operative position and a maintenance position. In one embodiment, a filter assembly is secured to a telescoping rod assembly so that it may be moved between operative and maintenance positions. Positioning the rod assembly vertically allows gravity to move the rod assembly to an extended position, and a winch and cable may be used to move the rod assembly to a retracted position. Keyways and channels may be used within the rods of the telescoping rod assembly so as to maintain rotational positioning of the filter assembly.

12 Claims, 7 Drawing Sheets

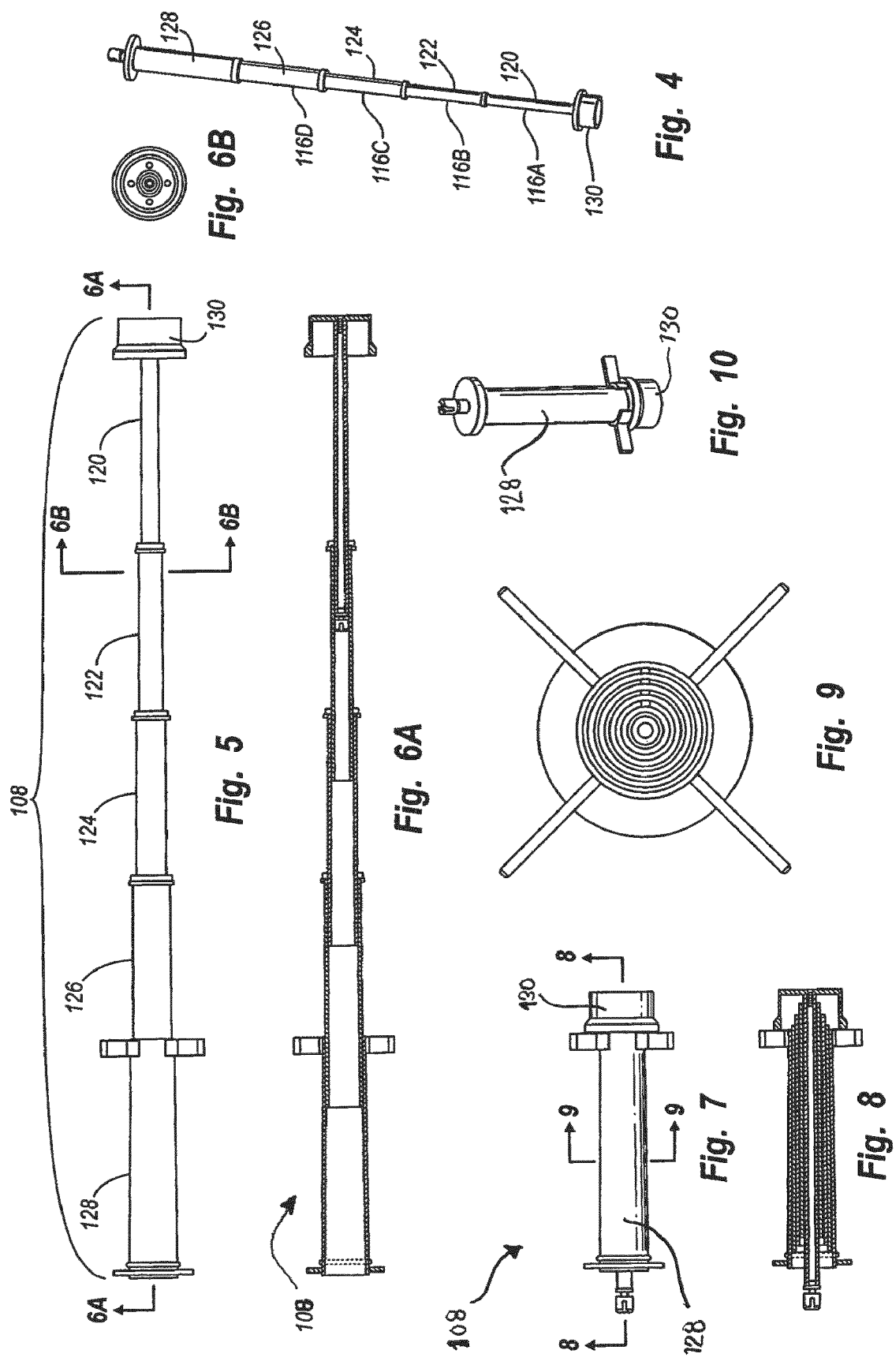

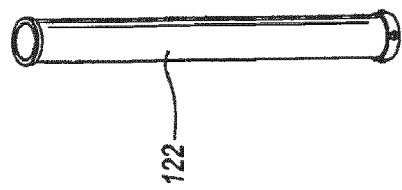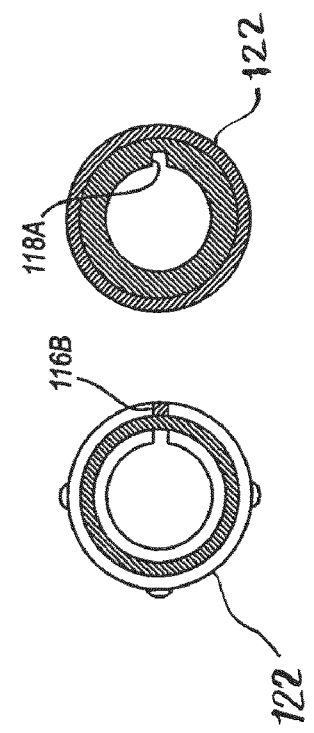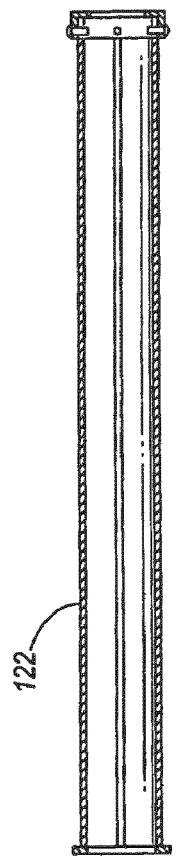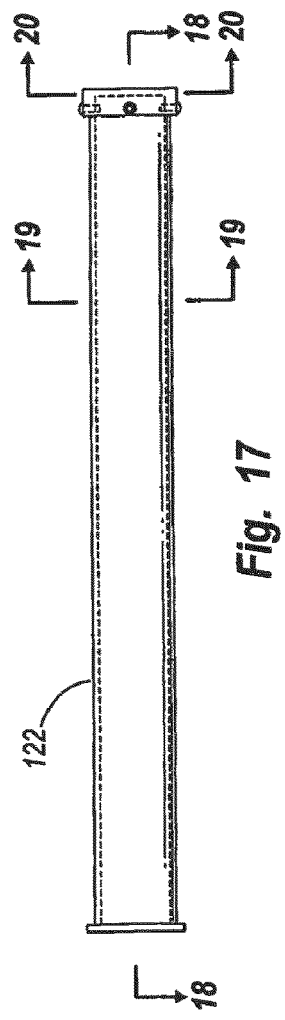

MOVABLE FILTER SYSTEM

CROSS-REFERENCE TO RELATED APPLICATIONS

This application claims priority to Provisional Application No. 60/603,387, filed on Aug. 20, 2004, which is incorporated herein in its entirety.

The application is related to U.S. Pat. No. 6,733,574, which is incorporated herein in its entirety.

BACKGROUND OF THE INVENTION

1. The Field of the Invention

The present invention relates generally to fluid bed granulators, coaters and dryers. In particular, the invention relates to a filter apparatus including a movable filter bundle that can be selectively raised and lowered to facilitate maintenance of one or more filter units on the movable filter bundle.

2. The Relevant Technology

Granulation is a crucial stage in many industries, such as mineral processing, agricultural products, detergents, pharmaceuticals, foodstuffs, and specialty chemicals. It is a size enlargement process where fine powder feed particles are bound together to form agglomerates or granules, a process that, for example, enables the formation of tablets.

Wet granulation, one type of granulation, is a process where the particles are bound together by a fluid (also called a binder) which forms liquid bridges between the particles to hold them together. The binding fluid is usually a solvent, like water or ethanol, or a solution of a polymeric binder in a solvent.

A fluid bed granulator is a tall cylindrical or rectangular vessel containing a bed of particles. Air is forced through a distributor at the base which fluidizes and agitates the powder. A binding fluid is added by spraying from above, below, or within the powder bed. These binder drops collide with the powder particles and form liquid bridges, which hold them together by capillary suction. By heating the fluidizing air, the product can be granulated and dried simultaneously, which is particularly useful in the specialty chemical and pharmaceutical industries.

Fluid bed granulators, coaters, and dryers create a large amount of dust that fills the process air used therein. In order to prevent the release of this dust into the environment these devices require the use of filter systems.

One such filter system is a bag filter system as illustrated in U.S. Pat. No. 5,446,974 to Gubler, herein incorporated by reference. The Gubler patent discloses a filter assembly having a fluid bed chamber wherein the process air enters from one end, is filtered by one or more bag filters, and exits the opposite end. The bag filters are rigidly attached to a mounting plate within the filter plenum during operation and are unattached and removed from the filter assembly for servicing.

The individual bag filters disclosed in the Gubler patent comprise flexible filter bags that are fitted over and clamped onto underlying rigid frames. During operation, the filter bags form around and through side bars of the rigid frame in an accordion shape. Periodic cleaning of the filter bags is achieved by applying a periodic pulse of reverse air to the bag filter, forcing the filter bag outward from the rigid frame and dislodging particulate matter that has accumulated on the filter bag. Although this is remarkably effective, the filter bag must be eventually removed and cleaned or replaced.

Of course, a variety of other filter assemblies, filters, and bag filters exist that can also be effectively used to filter process air. With each of these filter systems the degree of difficulty in cleaning or replacing a filter in a fluid bed system can increase costs and limit the operational time of the filter system and its corresponding fluid bed system.

U.S. Pat. No. 6,733,574, to Gubler, incorporated herein by reference in its entirety, teaches the use of a system for transporting a filter mount between a raised operative position and a lowered maintenance position that uses an index rod and associated structure to properly line up the filter mount when restored to the operative position after maintenance. This has been an effective approach for allowing simpler and faster maintenance than was found in prior art systems. However, it suffers from the tendency for the filter mount to spin and bang around as it is moved between the operative and maintenance positions.

BRIEF SUMMARY OF THE INVENTION

A movable filter system is provided for moving one or more filters of a filter assembly between an operative position and a maintenance position.

In one embodiment, a filter assembly is secured to a telescoping rod assembly so that it may be moved between operative and maintenance positions. Positioning the rod assembly vertically allows gravity to move the rod assembly to an extended position, and a winch and cable may be used to move the rod assembly to a retracted position.

Keyways and channels may be used within the rods of the telescoping rod assembly so as to maintain rotational positioning of the filter assembly.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 4 is a perspective view of the telescoping rod assembly depicted as a component of the movable filter system of FIGS. 2 and 3.

FIG. 5 is a side view of the telescoping rod assembly of FIG. 4 in the expanded state;

FIG. 6A is a cross-sectional view of the rod assembly of FIG. 5 taken along the lines A-A;

FIG. 6B is a cross-sectional view of the rod assembly of FIG. 5 taken along the lines AG-AG;

FIG. 7 depicts the rod assembly of FIG. 5 in and retracted state;

FIG. 8 is a cross-sectional view of the rod assembly of FIG. 7 taken along lines B-B;

FIG. 9 is a cross-sectional view of the rod assembly of FIG. 7 taken along the lines C-C;

FIG. 10 is a perspective view of the telescoping rod assembly of FIG. 4 shown in a retracted position;

FIG. 16 is a perspective view of the next higher rod member of the telescoping rod assembly;

FIG. 17 is a side view of the rod member of FIG. 16;

FIG. 18 is a cross-sectional view taken along line L-L of FIG. 17;

FIG. 19 is a cross-sectional view taken along line M-M of FIG. 17;

FIG. 20 is a cross-sectional view taken along line AL-AL of FIG. 17;

DETAILED DESCRIPTION OF THE PREFERRED EMBODIMENTS

The present invention relates to improved movable filter assemblies. The assemblies generally comprise a filter mount and a mechanism that can be selectively moved between an operative position and a maintenance position. In the operative position air is filtered through filters attached to the filter mount. In the maintenance position the one or more filters attached to the filter mount can be quickly inspected, serviced, and/or replaced. Thus, movable filter assemblies in accordance with the present invention minimize the down time that is required to service filters.

One advantage of the movable filter systems of the present invention is the ability to provide for ease of access to the filter(s). For example, it is often difficult to access filters in conventional filter assemblies and significant portions of an associated fluid bed system must often be disassembled in order to access filters for servicing. By way of contrast, the filter assembly of the present invention provides ready access to the filter(s) when the movable filter assembly is in the maintenance position.

Additional advantages of the present invention will become readily apparent to those skilled in the art from the following detailed description, wherein currently preferred embodiments of the invention are shown and described in the disclosure. The various specific details set forth in the following description provide a thorough understanding of the present invention by reference to an exemplary embodiment. It is to be understood that this exemplary embodiment is not to be limiting of the scope of the invention, and it will be apparent to one skilled in the art in view of the teachings herein that the present invention may be practiced without these specific details.

In some instances, well known aspects of fluidized bed and filtering processes and machinery have not been described in particular detail in order to avoid unnecessarily obscuring the present invention.

It is to be understood that the drawings, wherein like structures are provided with like reference designations, are diagrammatic and schematic representations of embodiments of the present invention and are not necessarily drawn to scale. In addition, the drawings only show the structures necessary to understand illustrations of the present invention. Additional structures known in the art have not been included to maintain the clarity of the drawings.

Figure 3:
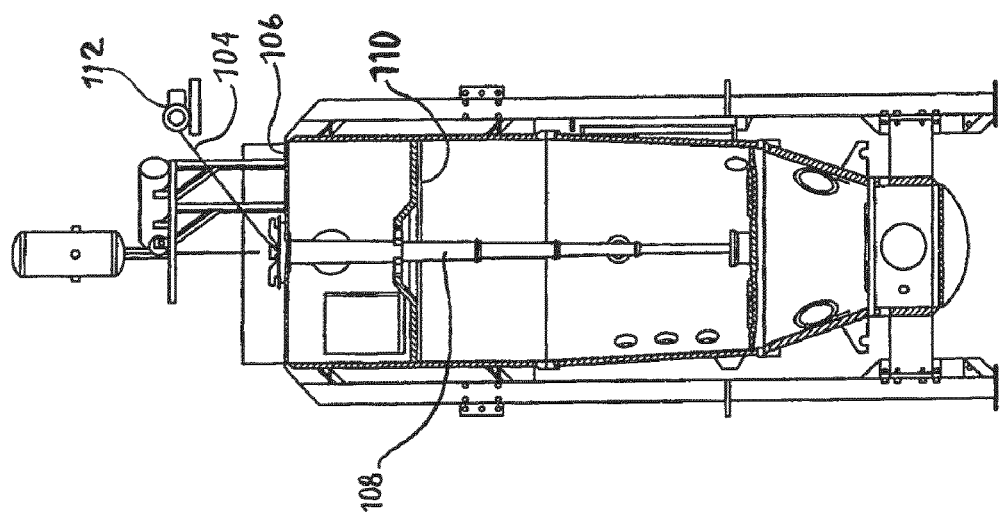
FIG. 3 is a cross-sectional view similar to FIG. 2, but showing elements of the movable filter system in the maintenance position.
Figure 2:
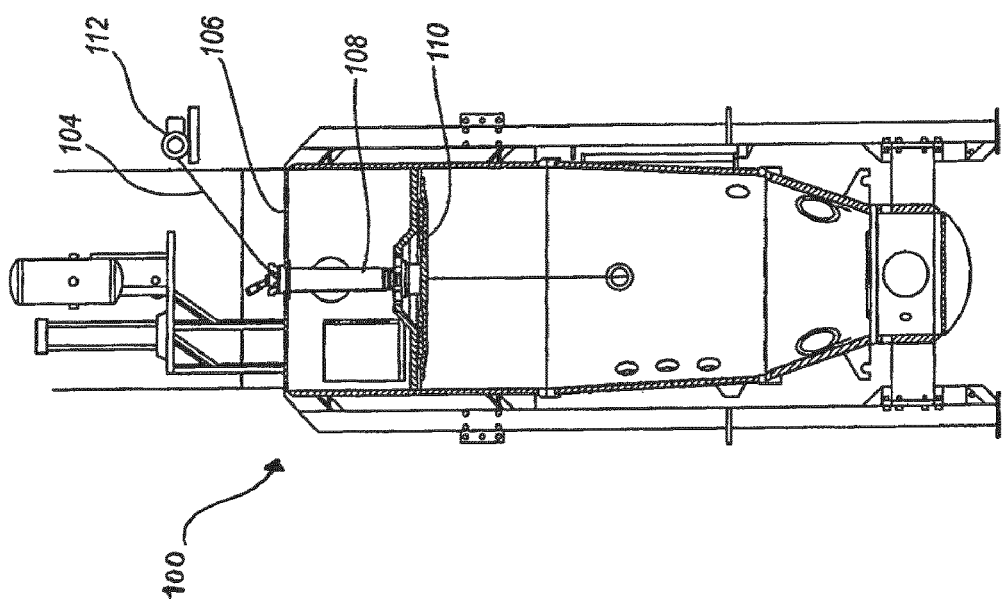
FIG. 2 is a cross-sectional view taken along the lines A-A of FIG. 1, and exposing elements of the movable filter system of the present invention in the operative position.
Figure 1:
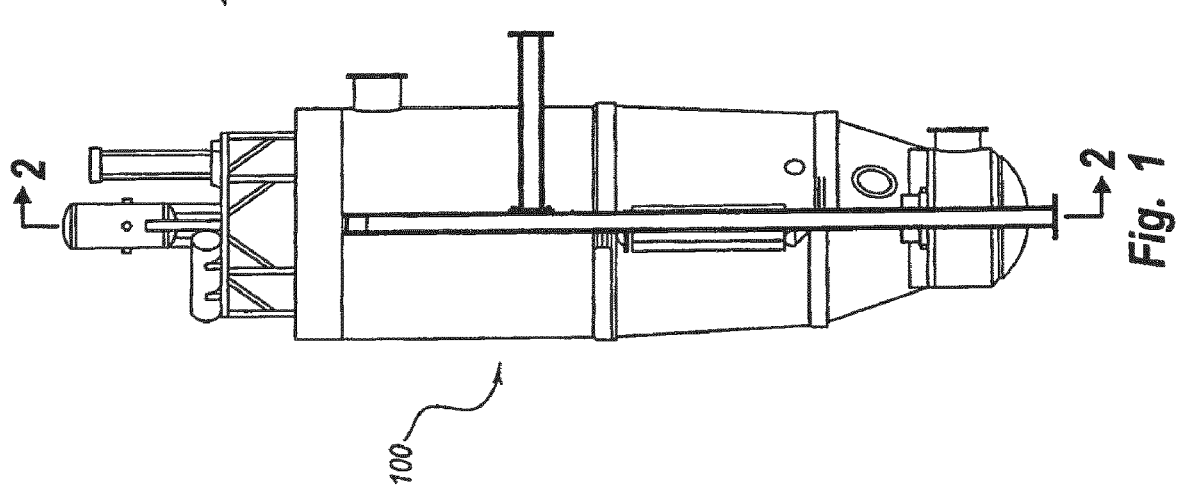
FIG. 1 is an elevation view of a granulator which contains the subject matter of the present invention.

FIG. 1 depicts a granulator system 100 which by reference to the cross-sectional view of FIGS. 2 and 3, contains an embodiment of a movable filter assembly in accordance with an aspect of the present invention.

FIG. 2 is a cross-sectional view of the granulator of FIG. 1. FIG. 2 depicts the securement of a telescoping rod assembly 108 to a top plate 106 at the upper end of the granulator system 100. The lower end of a telescoping rod assembly 108 is mounted to a filter connection plate 110, which in turn has mounts for one or more filters (not illustrated for clarity in the drawing). FIG. 2 depicts the telescoping filter mount assembly in the retracted position, which in this embodiment is the operative position for use when the granulator system 100 is in use.

FIG. 3 is substantially the same view as FIG. 2, but depicts the telescoping rod assembly 108 in the extended position, which in this embodiment is the maintenance position, and allows ready access to the filters for cleaning, replacement, inspection, or other maintenance activities.

Figure 11:
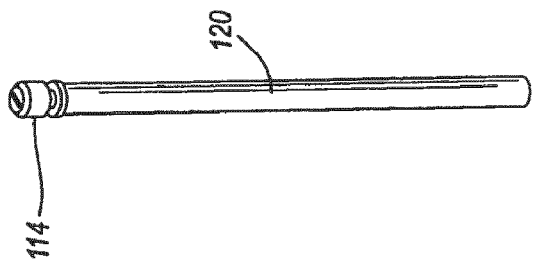
FIG. 11 is a perspective view of the lowest member of the illustrated telescoping rod assembly.

The illustrated embodiment of FIGS. 2 and 3 show the use of a winch 112 and an associated cable 104, which is attached to the lowermost of the rod members forming the rod assembly, as may be better seen by reference to FIG. 11, which illustrates the use of a cable mount 114 to receive and secure the end of cable 104. Although a winch and cable are depicted in the illustrated embodiment for moving the telescoping rod assembly between the maintenance and operative positions, it should be understood that other structures could be substituted for a winch and cable assembly. For example, one could substitute a hydraulic assembly to move the telescoping rod assembly 108 between the two positions, or one could use a gear assembly and an associated motor.

One aspect of the present invention is to provide the various members of the telescoping rod assembly 108 with a structure that serves to maintain the rotational orientation of filter connection plate 110 in both the operative and maintenance positions.

Figure 15:
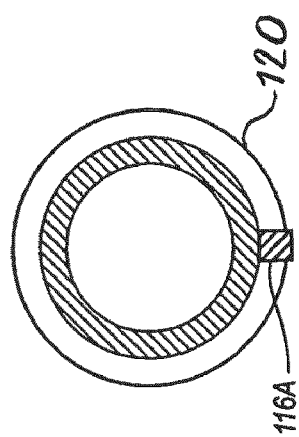
FIG. 15 is a cross-sectional view of the rod member of FIG. 14, taken along the line L-L.
Figure 13:
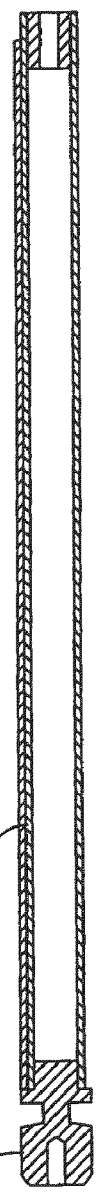
FIG. 13 is a cross-sectional view of the rod member of FIG. 12, taken along the line K-K.
Figure 12:
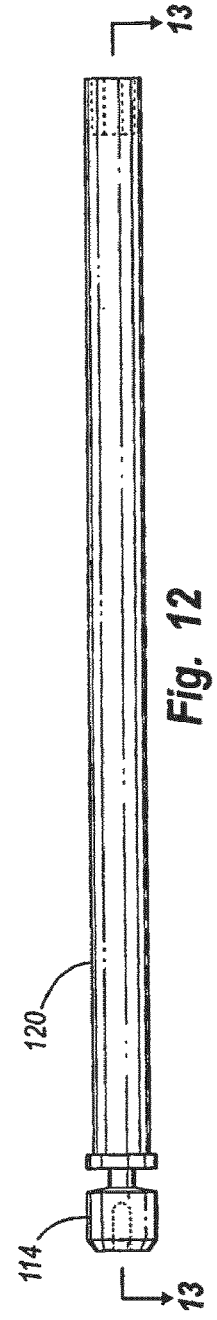
FIG. 12 is a side view of the rod member illustrated in FIG. 11.
Figure 14:
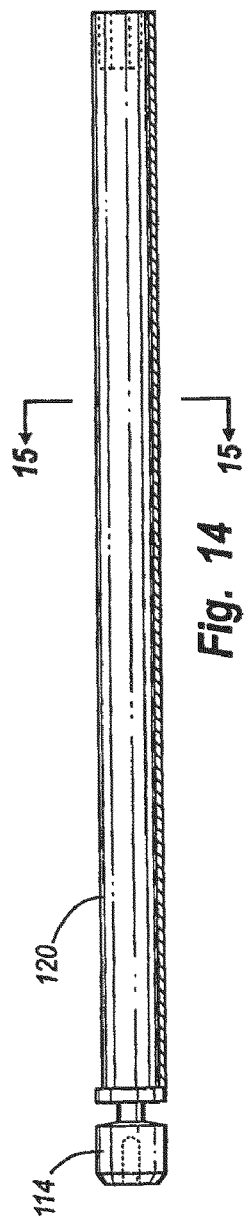
FIG. 14 is a side view of the rod member of FIG. 11.
Figure 21:
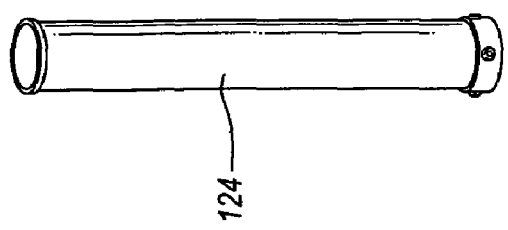
FIG. 21 is a perspective view of the next larger rod member of the telescoping rod assembly.
Figure 22:
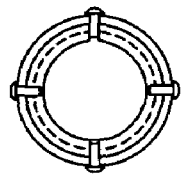
FIG. 22 is a top view of the rod member of FIG. 21.
Figure 24:
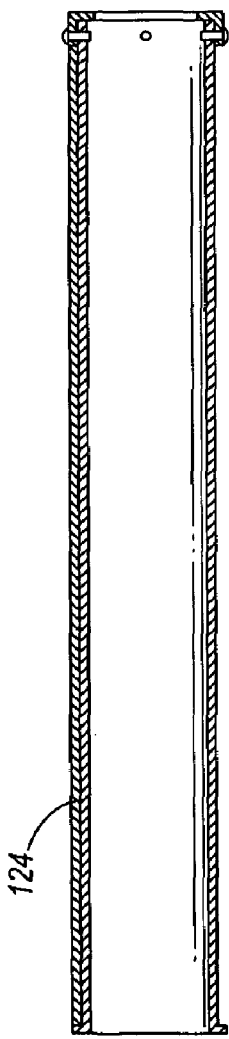
FIG. 24 is a cross-sectional view taken along line G-G of FIG. 23.
Figure 23:
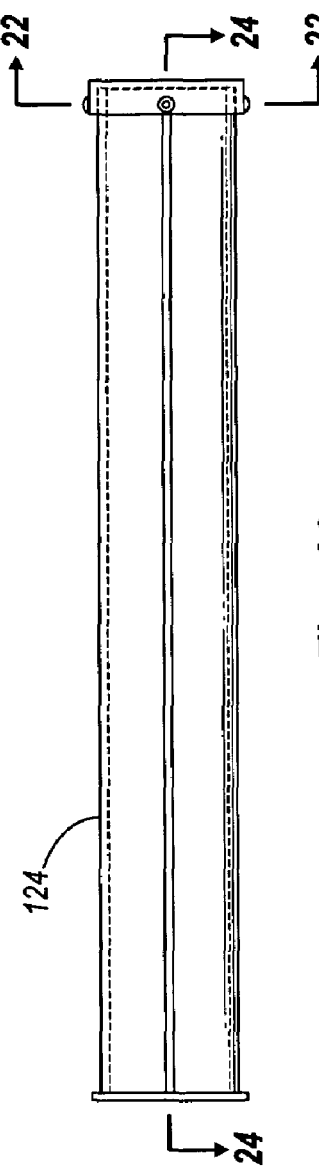
FIG. 23 is a side view of the rod member of FIG. 21.
Figure 25:
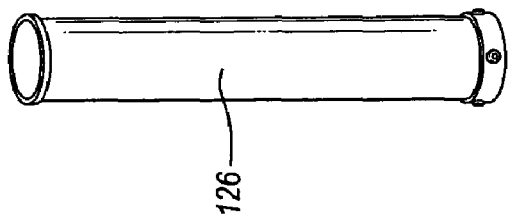
FIG. 25 is a perspective view of the next larger rod member of the illustrated telescoping rod assembly.
Figure 26:
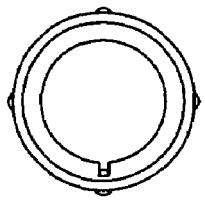
FIG. 26 is a top view of the rod member of FIG. 25.
Figure 28:
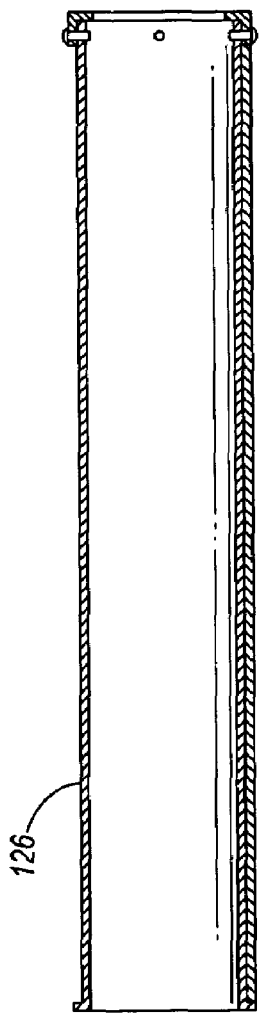
FIG. 28 is a cross-sectional view taken along the line H-H of FIG. 27.
Figure 27:
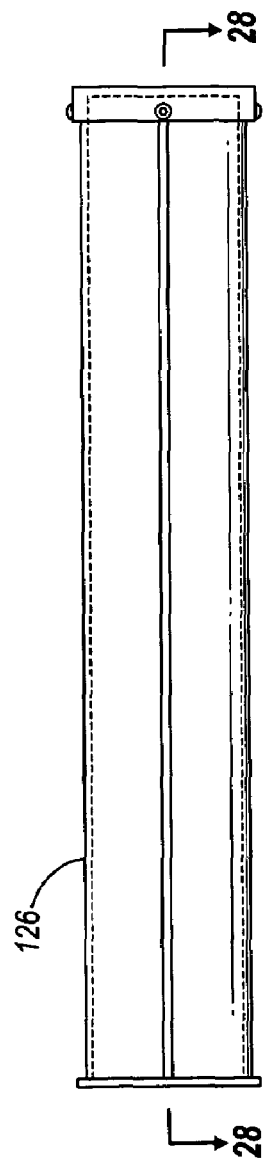
FIG. 27 is a side view of the rod member of FIG. 25.
Figure 29:
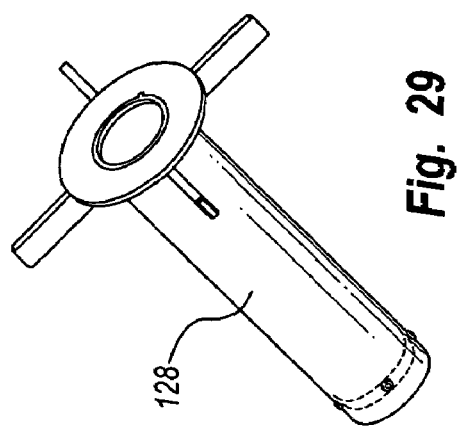
FIG. 29 is a perspective view of the largest rod member forming the illustrated telescoping rod assembly.
Figure 30:
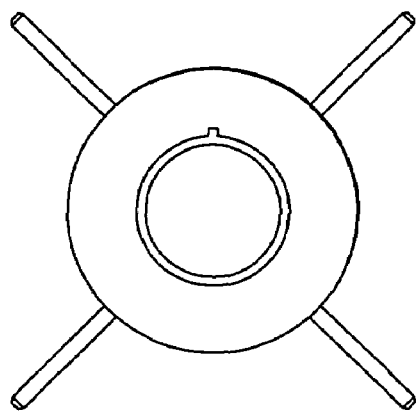
FIG. 30 is a top view of the rod member of FIG. 29.
Figure 32:
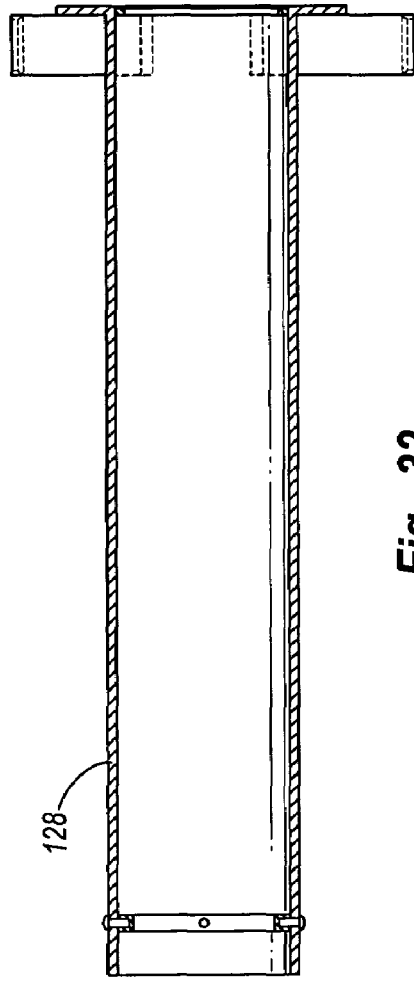
FIG. 32 is a cross-sectional view taken along line J-J of FIG. 31.
Figure 31:
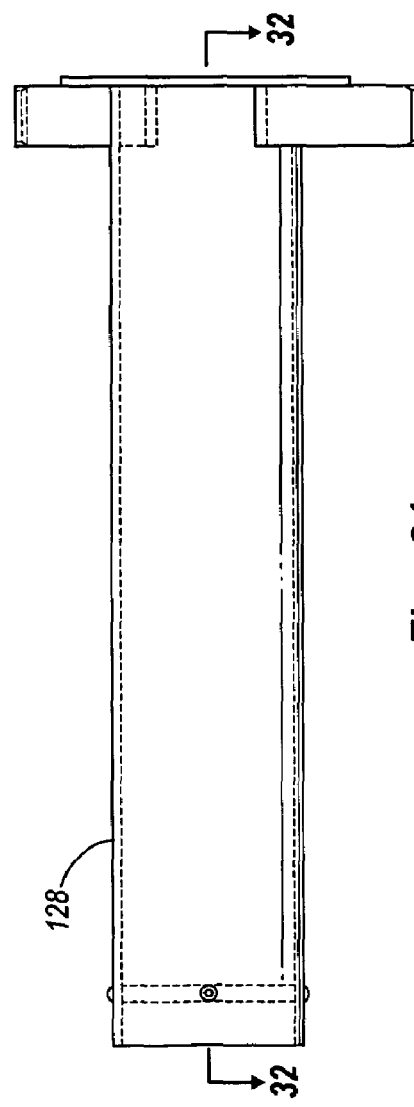
FIG. 31 is a side view of the rod member of FIG. 29.

The illustrated embodiment utilizes a series of sections of keystock and corresponding grooves in neighboring rod members to maintain the rotational orientation of the filter connection plate 110. For example, FIG. 14 depicts the use of keystock sections 116A, 116B, 116C, and 116 D on rod sections 120, 122, 124 and 126, respectively. FIG. 20 illustrates the use of a groove 118A in rod member 122 that is sized and shaped to receive keystock 116A of rod member 120 (illustrated in FIGS. 14 and 15) in sliding engagement in a manner that permits easy extension or retraction of the rod members 120, 122 while maintaining rotational positioning of the two rod members with respect to one another and, accordingly, to the filter connection plate 110 affixed to the lower end of rod member 120. It should of course be understood that other structures may be used for maintaining such rotational positioning.

FIGS. 5, 6A, 6B, 7, 8 and 9 further illustrate aspects of telescoping rod assembly 108. FIGS. 11, 12, 13, 14 and 15 show aspects of rod member 120. FIGS. 16, 17, 18, 19 and 20 illustrate aspects of rod member 122. FIGS. 21, 22, 23 and 24 illustrate aspects of rod member 124. FIGS. 25, 26, 27 and 28 illustrate aspects of rod member 126. FIGS. 29, 30, 31 and 32 illustrate aspects of rod member 128.

FIGS. 4 and 5 illustrate the use of a filter plate attachment 130 for use in affixing filter connection plate 110 to rod member 120. It would be possible to use an alternative structure to affix the lower end of rod member 120 to the filter connection plate 110, or to weld the two together, or to use some other structure for effecting securement of the filter connection plate 110.

Many changes to the specifics of the illustrated embodiment are contemplated within the scope of the present invention. For example, the illustrated system is a granulator, but could be another system. The illustrated granulator system 100 uses gravity to assist in lowering the movable filter system as the winch 112 lowers the attached cable 104, but it would be possible to operate a movable filter system without reliance on gravity. The illustrated system depicts the operative position of the movable filter system in the retracted positioning of the telescoping rod assembly 108, but it is possible to design the system so that the maintenance position is reached while the telescoping rod assembly 108 is retracted and the operative position is obtained by extending the telescoping rod assembly 108. It has already been noted that alternatives to a key stock and groove system could be used to maintain rotational positioning when such positioning is desired. It would also be possible to utilize multiple telescoping rod assemblies, each associated with single or multiple filters rather than the single telescoping rod assembly 108 as illustrated. One of ordinary skill would appreciate many additional changes that might be made after reviewing the teachings herein.

The illustrated embodiment depicts the use of five telescoping rod members 120, 122, 124, 126, and 128. It should be appreciated that more than five rod members or fewer than five rod members may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A movable filter system, comprising:
   (a) a filter assembly comprising one or more filters; and
   (b) a telescoping rod assembly connected to said filter assembly, said telescoping rod assembly being movable between a first extension length to configure said filter assembly in an operative position and a second extension length to configure said filter assembly in a maintenance position, said telescoping rod assembly being configured to maintain a rotational positioning of said filter assembly in said operative position and said maintenance position, said telescoping rod assembly including a plurality of telescoping rods comprising:
   a first rod of said plurality of telescoping rods having a first rod outer surface of a first rod outer diameter, said first rod outer surface having a first rod keystock positioned thereon;
   a second rod of said plurality of telescoping rods having a second rod outer surface of a second rod outer diameter and a second rod inner surface, said second rod inner surface having a second rod inner diameter and having a groove therein configured to receive said first rod keystock, said second rod inner diameter being greater than said first rod outer diameter; and
   said first rod configured to be telescopically received within said second rod when said telescoping rod assembly is in one of said first extension length and said second extension length.

2. The movable filter system of claim 1, wherein the first rod of said telescoping rod assembly includes a filter plate attachment configured to secure said filter assembly to said telescoping rod assembly.

3. The movable filter system of claim 2, wherein each additional rod of said plurality of telescoping rods includes an outer surface of an outer diameter, said outer surface having a keystock positioned thereon, and an inner surface, said inner surface having an inner diameter and having a groove therein, said inner diameter and groove configured to telescopically receive a first adjacent additional rod, and further to be telescopically received by another adjacent additional rod.

4. The movable filter system of claim 1, wherein said operative position and said maintenance position are located in a vertical arrangement with respect to one another, and wherein said telescoping rod assembly for moving said filter assembly between said operative position and said maintenance position further comprises a winch and a cable configured to connect to said telescoping rod assembly for use in raising said filter assembly to a raised position, and which allows gravity to assist in moving said filter assembly to a lower position.

5. The movable filter system of claim 4, wherein said raised position is said operative position, and wherein said lowered position is said maintenance position.

6. A movable filter system, comprising:
   (a) a filter assembly comprising one or more filters;
   (b) a telescoping rod assembly secured to the filter assembly, said telescoping rod assembly includes a winch and a cable configured to connect to said telescoping rod assembly to move said telescoping rod assembly between a retracted position which places said filter assembly in an operative position, and an extended position which places said filter assembly in a maintenance position.

7. The movable filter system of claim 6, wherein said telescoping rod assembly includes a plurality of telescoping rods, said plurality of telescoping rods comprising:
   a first rod of said plurality of telescoping rods having a first rod outer surface of a first rod outer diameter, said first rod outer surface having a first rod keystock positioned thereon;
   a second rod of said plurality of telescoping rods having a second rod outer surface of a second rod outer diameter and a second rod inner surface, said second rod inner surface having a second rod inner diameter and having a groove therein configured to receive said first rod keystock, said second rod inner diameter being greater than said first rod outer diameter; and, said first rod configured to be telescopically received within said second rod when said telescoping rod assembly is in one of said first extension length and said second extension length.

8. The movable filter system of claim 7, wherein said telescoping rod assembly is situated so that said retracted position and said extended position are located in a vertical arrangement with respect to one another, and wherein each additional rod of said plurality of telescoping rods includes an outer surface of an outer diameter, said outer surface having a keystock positioned thereon, and an inner surface, said inner surface having an inner diameter and having a groove therein, said inner diameter and groove configured to telescopically receive a first adjacent additional rod, and further to be telescopically received by another adjacent additional rod, said keystocks and grooves configured to maintain a rotational positioning of said filter assembly.

9. A movable filter system, comprising:
(a) a filter assembly comprising one or more filters; and
(b) a telescoping rod assembly secured to said filter assembly, said telescoping rod assembly being movable between a retracted position which places said filter assembly in an operative position, and an extended position which places said filter assembly in a maintenance position, said retracted position and said extended position being located in a vertical arrangement with respect to one another, said telescoping rod assembly including a plurality of telescoping rods, each rod of said plurality having an outer surface of an outer diameter, said outer surface having a keystock positioned thereon, and an inner surface, said inner surface having an inner diameter and having a groove therein, said inner diameter and groove configured to telescopically receive a first adjacent additional rod, and further to be telescopically received by another adjacent additional rod, said keystocks and grooves configured to maintain a rotational positioning of said filter assembly.

10. A granulator system, comprising:
a top plate positioned proximate a top of said granulator system, said top plate covering an interior of said granulator system:
a filter assembly comprising one or more filters; and,
a telescoping rod assembly secured to said lop plate and positioned at least partially within said interior of said granulator system, said filter assembly secured to said telescoping rod assembly, said telescoping rod assembly being movable between a retracted position which places said filter assembly in an operative position, and an extended position which places said filter assembly in a maintenance position, said retracted position and said extended position are located in a vertical arrangement with respect to one another, said telescoping rod assembly including a plurality of telescoping rods, each rod of said plurality having an outer surface of an outer diameter, said outer surface having a keystock positioned thereon, and an inner surface, said inner surface having an inner diameter and having a groove therein, said inner diameter and groove configure to telescopically receive a first adjacent additional rod, and further to be telescopically received by another adjacent additional rod, said keystocks and grooves configured to maintain a rotational positioning of said filter assembly.

11. The granulator system of claim 10, wherein said telescoping rod assembly further comprises a winch and a cable configured to connect to said telescoping rod assembly to move said telescoping rod assembly between said retracted position and said extended position.

12. The granulator system of claim 11, wherein said telescoping rod assembly includes a filter plate attachment configured to secure said filter assembly to said telescoping rod assembly.

* * * * *